(12) United States Patent
Dantoni et al.

(10) Patent No.: US 7,894,787 B2
(45) Date of Patent: *Feb. 22, 2011

(54) METHOD AND SYSTEM FOR CONTROLLING CARRIER LEAKAGE IN A DIRECT CONVERSION WIRELESS DEVICE

(75) Inventors: Francesco Dantoni, Richardson, TX (US); Anil K V Kumar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 176 days.

This patent is subject to a terminal disclaimer.

(21) Appl. No.: 12/244,576

(22) Filed: Oct. 2, 2008

(65) Prior Publication Data

US 2009/0143022 A1 Jun. 4, 2009

Related U.S. Application Data

(63) Continuation of application No. 10/837,119, filed on Apr. 30, 2004, now Pat. No. 7,450,923.

(51) Int. Cl.
*H04B 1/10* (2006.01)
(52) U.S. Cl. .................................. 455/285; 455/550.1
(58) Field of Classification Search .................. 455/73, 455/78, 53, 126, 550.1, 285
See application file for complete search history.

(56) References Cited

U.S. PATENT DOCUMENTS

2004/0203472 A1* 10/2004 Chien .......................... 455/68
2004/0204036 A1* 10/2004 Yang ....................... 455/553.1

* cited by examiner

*Primary Examiner*—Tu X Nguyen
(74) *Attorney, Agent, or Firm*—William B. Kempler; Wade J. Brady, III; Frederick J. Telecky, Jr.

(57) ABSTRACT

A system for controlling carrier leakage in a communications device includes a first mixer unit operable to receive and convert a first signal into a second signal having a higher frequency than the first signal, and to transmit the second signal, a second mixer unit operable to receive, convert the second signal into an in-phase signal and a quadrature signal each having lower frequency than the second signal, and transmit them, a processor coupled to the first mixer and the second mixer to perform a leakage reduction procedure by receiving and sampling the in-phase signal and the quadrature signal, determining that a result from the sampling is not equal to a predetermined value, initiating a transmission of a direct current offset signal to the first mixer unit, and adjusting a voltage of the direct current offset signal until a next result of the sampling approximately equals the predetermined value.

11 Claims, 3 Drawing Sheets

000# METHOD AND SYSTEM FOR CONTROLLING CARRIER LEAKAGE IN A DIRECT CONVERSION WIRELESS DEVICE

TECHNICAL FIELD OF THE INVENTION

This invention relates generally to communications devices and more particularly to a method and system for controlling carrier leakage in a direct conversion wireless device.

BACKGROUND OF THE INVENTION

Wireless devices, such as cellular phones and wireless modems, provide a convenient method of communication. Many wireless devices are designed to transmit high frequency signals because of the transmission efficiency and other associated advantages. To transmit a high frequency signal, a wireless device may convert a low frequency signal that represents the input of a user into the high frequency signal for transmission. Also, a wireless device may be required to convert a high frequency signal that it receives from another wireless device and convert the received frequency signal into a low frequency signal so that the converted signal may be processed into an appropriate output form for the user. One method of converting signals is generally known as direct conversion, which refers to a simplified conversion process that uses fewer mixers, which are driven by a phase lock loop oscillator to conduct the conversion process. Direct conversion generally occurs in a transceiver chip of the wireless communications device. The output of phase locked loop oscillator is referred to as "carrier." During the direct conversion process conducted by a transmitter portion of a transceiver chip, the carrier is modulated with the data to be transmitted.

A communications device using the direct conversion process may be susceptible to unmodulated carrier component that may be mixed in with a transmitted output signal of the transceiver chip. Such a component may be referred to as "carrier leakage." Carrier leakage may effectively limit the total transmitter power level range in many wireless devices because the level of carrier leakage stays constant even when the transmitter power level is low, and some wireless devices may be required to comply with industry-defined standards that limit ratio between the level of carrier leakage and transmission signals.

SUMMARY OF THE INVENTION

According to one embodiment of the invention, a system for controlling carrier leakage in a communications device is provided. The system includes a first mixer unit operable to receive a first signal, to convert the first signal into a second signal having a higher frequency than the first signal, and to transmit the second signal. The system also includes a second mixer unit. The second mixer unit is operable to receive the second signal, to convert the second signal into an in-phase signal and a quadrature signal each having lower frequency than the second signal, and to transmit the in-phase signal and the quadrature signal. The system also includes a processor coupled to the first mixer and the second mixer. The processor is operable to perform a leakage reduction procedure by receiving the in-phase signal and the quadrature signal from the second mixer, sampling the in-phase signal and the quadrature signal, determining that a result from the sampling is not equal to a predetermined value, initiating a transmission of a direct current offset signal to the first mixer unit, and adjusting a voltage of the direct current offset signal until a next result of the sampling approximately equals the predetermined value.

Some embodiments of the invention provide numerous technical advantages. Other embodiments may realize some, none, or all of these advantages. For example, in one embodiment, the transmitter power level range is increased without a corresponding increase of the carrier leakage by periodically reading the level of carrier leakage at a transmitter output and applying an appropriate direct current offset signal at an input side of the transmitter in order to reduce the carrier leakage. In another embodiment, the precision of transmitter gain control is improved by controlling the gain before the baseband signal is up converted to a transmission signal.

Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Figure 1:
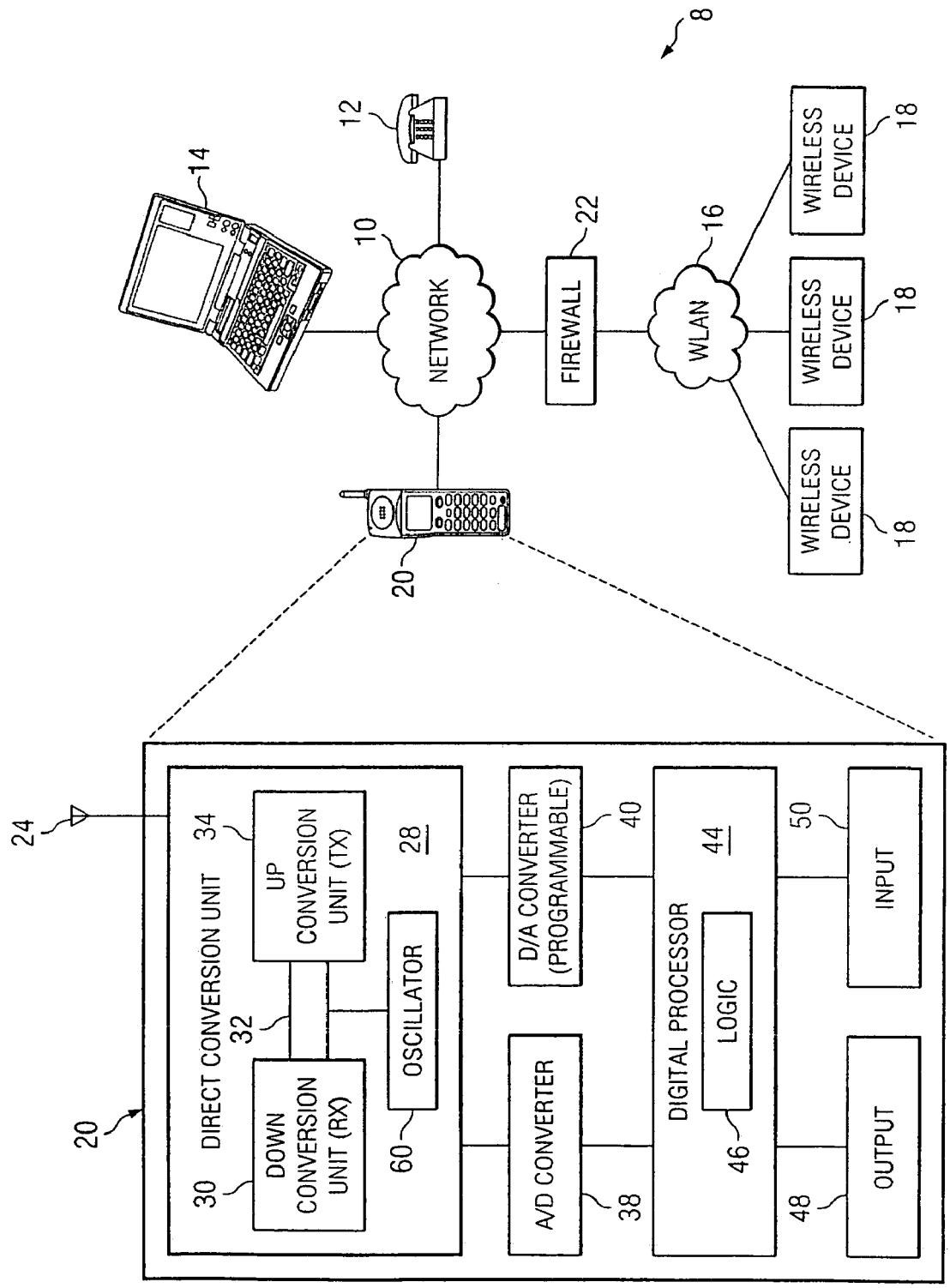
FIG. 1 is a schematic diagram illustrating one embodiment of a communications network that may benefit from the teachings of the present invention.
Figure 2:
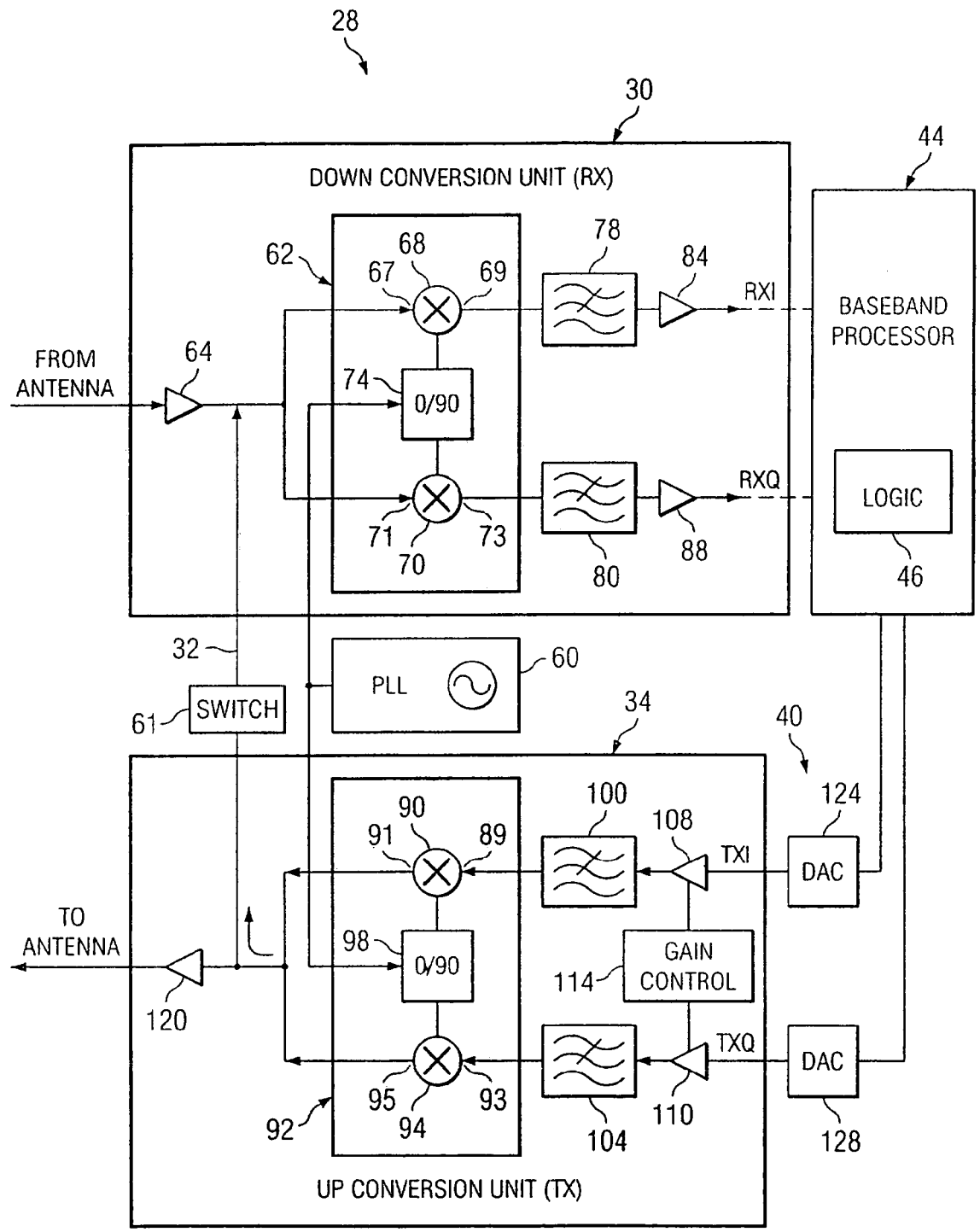
FIG. 2 is a circuit diagram of a direct conversion unit of a wireless communications device shown in FIG. 1.
Figure 3:
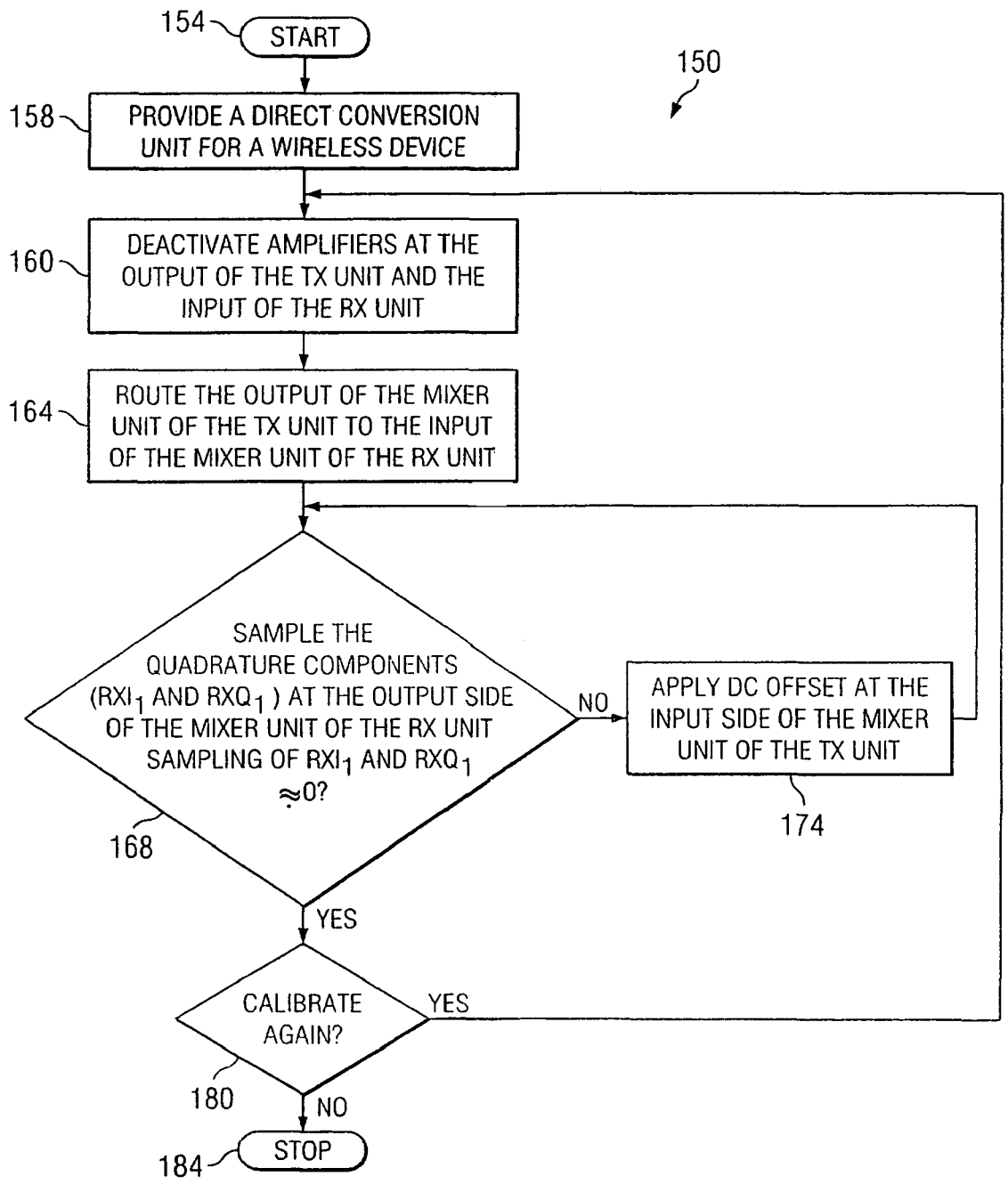
FIG. 3 is a block diagram illustrating one embodiment of a method for reducing carrier leakage in a wireless communications device.

Embodiments of the invention are best understood by referring to FIGS. 1 through 3 of the drawings, like numerals being used for like and corresponding parts of the various drawings.

FIG. 1 is a schematic diagram illustrating one embodiment of a communications system 8 that may benefit from the teachings of the present invention. System 8 includes a communications network 10 that couples communications devices 12, 14, 18, and 20 to each other. Communications devices may be coupled directly to network 10, as shown by communications devices 12, 14, and 20, or coupled through a separate local area network, such as wireless local area network ("WLAN") 16 as shown in FIG. 1. For example, wireless devices 18 are coupled to network 10 through WLAN 16 and a firewall 22 that protects WLAN 16 from unauthorized access.

Communications network 10 may include different types of networks. For example, communications network 10 may include a public switched telephone network ("PSTN"), a cellular network, the Internet, Intranet, local area networks ("LAN"), wide area networks ("WAN"), and metropolitan area networks ("MAN"). Network 10 may be formed from any suitable signal conduits, such as wire and/or wireless links.

Communications devices 12, 14, 18, and 20 may be any device that allows multiple parties to communicate with each other. As shown in FIG. 1, examples of communications devices 12, 14, and 20 include, but are not limited to, laptop 14 having a wireless modem, telephone 12, and cellular phone 20. Devices 18 may be any suitable wireless communications device configured to communicate with other devices through WLAN 16. Examples of devices 18 include, but are not limited to, a laptop having a wireless modem and a wireless personal digital assistant ("PDA"). WLAN 16 allows wireless devices 18 to remotely access a server (not explicitly shown in FIG. 1) that is coupled to network 10. Although WLAN 16 is shown as an example of a separate network that may be coupled to network 10, any suitable WI-FI application or other types of networks may be a separate network coupled to network 10.

As shown in FIG. 1, phone 20 comprises an antenna 24, a direct conversion unit 28, an analog-to-digital converter 38, a digital-to-analog converter 40, a digital processor 44, an output 48, and an input 50. Direct conversion unit 28 includes an oscillator 60 that is coupled to a down conversion unit 30 and an up conversion unit 34. Direct conversion unit 28 is coupled to converters 38 and 40. Converters 38 and 40 are coupled to digital processor 44. Digital processor 44 is coupled to output 48 and input 50.

Direct conversion unit 28 is operable to perform direct conversion of signals. Using up conversion unit 34, direct conversion unit 28 is operable to receive a signal having a low frequency from digital-to-analog converter 40, to convert the received signal into a signal having a high frequency, and to transmit the converted signal through antenna 24. Direct conversion unit 28 is also operable, using down conversion unit 30, to receive a signal having a high frequency from antenna 24, to convert the received signal into a signal having a low frequency, and to transmit the converted signal to output 48 through converter 38 and processor 44. Oscillator 60 is operable to drive one or more mixers and phase shifters (not explicitly shown in FIG. 1) of down conversion unit 30 and up conversion unit 34 at a relatively constant frequency. The conversion from a high frequency to a low frequency is referred to as a "down conversion." The conversion from a low frequency to a high frequency is referred to as a "up conversion." The frequency to which a signal is up converted by direct conversion unit 28 for transmission through antenna 24 is referred to as a "transmit frequency." The frequency to which a signal received from antenna 24 is down converted by direct conversion unit 28 is referred to as a "baseband" frequency.

The actual value of a transmit frequency depends on the particular standard that may be applicable to a wireless communications device. For example, where IEEE 802.11b standard may be applicable to a device using WI-FI technology, the signals that are transmitted or received has a frequency of 2.4 GHz. The actual value of a baseband frequency depends on the specification of each wireless communications device. For example, a baseband processor and an output unit of a cellular phone may be designed to work with signals having a frequency of 1 MHz.

Analog-to-digital converter 38 is operable to receive a signal having a baseband frequency (referred to also as "baseband signal") from down conversion unit 30 and to convert the received signal into a digital signal. Converter 38 is operable to transmit the converted digital signal to digital processor 44. Digital-to-analog converter 40 is operable to receive a digital signal having a baseband frequency from digital processor 44, to convert the received signal into an analog signal, and to transmit the converted analog signal to up conversion unit 34.

Digital processor 44 is operable to convert a digital signal received from converter 38 into a format that is understandable to a user of phone 20, and to convert analog signal generated from input 50 into a format that is suitable for processing by digital-to-analog converter 40. For example, where output 48 is a speaker and input 50 is a microphone, digital processor 44 is operable to receive digital signals from converter 38 and process the received signals into an analog form that may be used to drive speaker 48. Digital processor 44 is also operable to receive analog signals representing a user's speech from microphone 50 and process the received signals into a format compatible with digital-to-analog converter 40. In one embodiment, digital processor 44 is a baseband processor.

Input 50 may be any type of device that is operable to convert a signal generated by a user of phone 20 and converted into an electronic format. For example, input 50 may be a microphone that is operable to convert speech generated by the user into an electronic analog signal. Output unit 48 may be any device that is operable to convert an electronic signal into a type of signal that may be understood by the user of phone 20. For example, output 48 may be a speaker that is operable to receive an electronic analog signal and convert it into sound. Different wireless communications devices may have different types of output 48 and input 50. For example, for a wireless PDA or a laptop with a wireless modem, output 48 may be a display screen and input 50 may be a keyboard or a keypad. Thus, in such examples, output 48 may be operable to convert an electronic signal into visible alphanumeric characters, and input 50 may be operable to allow a user to enter alphanumeric characters and to convert those characters into appropriate electronic signals. Details analogous to those provided above in conjunction with phone 20 may be applicable to other types of wireless communications device, such as a wireless PDA, a laptop having a wireless modem, communications devices using WI-FI technology, or any other suitable wireless communications devices.

The transmitter of a communications device using a direct conversion process may be susceptible to a higher level of carrier signal than what is desirable, which is often referred to as "carrier leakage." Carrier leakage may be generated from direct current offset of baseband signals prior to reaching direct conversion unit 28, device mismatch within up conversion unit 34 of unit 28, and the coupling from oscillator 60 to up conversion unit 34. Carrier leakage may effectively limit the total transmitter power level range in many wireless devices because the level of carrier leakage generally does not change even when the transmitter power level is lowered, and some wireless devices may be required to comply with industry-defined standards that limit the ratio between the level of carrier leakage and transmission signals.

According to one embodiment of the invention, the transmitter power level range is increased without a corresponding increase of the carrier leakage by periodically reading the level of carrier leakage at an output of an up conversion unit and applying an appropriate direct current offset signal at an input side of the up conversion unit in order to reduce the carrier leakage. In another embodiment, the precision of transmitter power level control is improved by controlling the gain before the baseband signal is up converted to a transmission signal having a transmit frequency. Some embodiments of the invention may utilize some, none, or all of these advantages.

Referring back to FIG. 1, a path 32 is provided to route an output signal having a transmit frequency from up converter unit 34 to an input of down conversion unit 30. Logic 46 is provided to digital processor 44 so that digital processor 44 may sample the quadrature components of the routed signal that is down converted by down conversion unit 30. The result of the sampling is proportional to the level of carrier leakage at the output of up conversion unit 34. If the result of the sampling is not equal to a predetermined value, logic 46 is operable to apply an appropriate direct current offset ("DC offset") signal to the input of up conversion unit 34 using converter 40 until the result of the sampling is substantially equal to the predetermined value. In one embodiment, the predetermined value may be zero; however, any predetermined value that is within the tolerance level of a particular wireless device may be used. Cellular phone 20 is used as an example device herein to describe some embodiments of the present invention. However, any direct conversion communications device that may experience carrier leakage at a transmitter output may benefit from the teachings of this invention.

FIG. 2 is a circuit diagram illustrating one embodiment of direct conversion unit 28, converter 40, and processor 44 shown in FIG. 1. As described above, direct conversion unit 28 comprises conversion units 30, 34, and oscillator 60. Down conversion unit 30 comprises an amplifier 64, mixers 68 and 70, low pass filters 78 and 80, amplifiers 84 and 88, and a phase shifter 74. Mixer 68 includes an input 67 and an output 69. Mixer 70 includes an input 71 and an output 73. Mixers 68, 70, and phase shifter 74 are jointly referred to as a mixer unit 62 of down conversion unit 30.

Amplifier 64 is coupled to input 67 and 71 of mixers 68 and 70, respectively. Outputs 69 and 73 are respectively coupled to low pass filters 78 and 80. Filters 78 and 80 are respectively coupled to amplifiers 84 and 88. Phase shifter 74 is coupled to mixers 68 and 70. Phase shifter 74 is also coupled to oscillator 60.

Up conversion unit 34 comprises an amplifier 120, mixers 90 and 94, low pass filters 100 and 104, a phase shifter 98, and amplifiers 108 and 110. Mixer 90 includes an input 89 and an output 91. Mixer 94 includes an input 93 and an output 95. Mixers 90, 94, and phase shifter 98 are jointly referred to as mixer unit 92 of up conversion unit 34.

Amplifier 120 is coupled to respective outputs 91 and 95 of mixers 90 and 94. Respective inputs 89 and 93 of mixers 90 and 94 are coupled to filters 100 and 104, respectively. Filters 100 and 104 are respectively coupled to amplifiers 108 and 110. Phase shifter 98 is coupled to mixers 90 and 94. Phase shifter 98 is also coupled to oscillator 60.

Referring to down conversion unit 30, amplifier 64 is operable to receive a signal transmitted by another wireless device through antenna 24, to amplify the signal, and to transmit the amplified signal to mixers 68 and 70. Phase shifter 74 is operable to affect a phase shift of 90 degrees between the signal received by mixer 68 and the signal received by mixer 70. In one embodiment, the signal at mixer 70 may be shifted 90 degrees from the signal received at mixer 68, in which case mixer 68 may be referred to as in-phase mixer 68 and mixer 70 may be referred to as quadrature mixer 70. Mixers 68 and 70 are each operable to recover the quadrature components of the signal received from amplifier 64 to a baseband frequency which, as described above, is lower than a transmit frequency. Mixers 68 and 70 are also operable to transmit their respectively down converted signals through their respective outputs 69 and 73. Mixers 68 and 70 are driven by oscillator 60, which provides a constant frequency input using a phase lock loop circuitry. Low pass filters 78 and 80 are operable to receive the down converted signals and filter the signals for transmission to amplifiers 84 and 88. Amplifiers 84 and 88 are operable to amplify their respectively filtered signals and transmit the amplified signals to baseband processor 44 for processing.

Referring to up conversion unit 34, amplifiers 108 and 110 are operable to amplify the respective quadrature components of a signal received from baseband processor 44, and to transmit the amplified quadrature components to low pass filters 100 and 104, respectively. Low pass filters 100 and 104 are operable to receive the amplified signals and to filter the signals for transmission to respective inputs 89 and 93 of mixers 90 and 94. Mixers 90 and 94 are each operable to modulate the received quadrature components of the signal to a transmit frequency which, as described above, is higher than the baseband frequency. Mixers 90 and 94 are also operable to transmit their respectively up converted signals through their respective outputs 91 and 95 to amplifier 120. Phase shifter 98 is operable to affect a phase shift of 90 degrees between the signal to be transmitted by mixer 90 and the signal to be transmitted by mixer 94. In one embodiment, the signal at mixer 94 may be shifted 90 degrees from the signal received at mixer 90, in which case mixer 90 may be referred to as in-phase mixer 90 and mixer 94 may be referred to as quadrature mixer 94. Mixers 90 and 94 are driven by oscillator 60, which provides a constant frequency input using a phase lock loop circuitry. Amplifier 120 is operable to receive a signal transmitted by mixer unit 92, amplify the received signal, and transmit the amplified signal to another wireless device through antenna 24.

According to one embodiment of the invention, path 32 is provided between units 30 and 34 that routes signal transmitted from outputs 91 and 95 of mixer unit 92 to inputs 67 and 71 of mixer unit 62. As shown in FIG. 2, in one embodiment, path 32 is provided so that the signal is routed prior to reaching amplifier 120 and inserted into inputs 67 and 71 without being amplified by amplifier 64. In one embodiment, a switch 61 is provided that is operable to open and close path 32. Switch 61 is operable to close and thus route the signal over path 32 when a carrier leakage reduction procedure is performed. In one embodiment, switch 61 may be operable to turn off amplifiers 64 and 120 when the carrier leakage reduction procedure is performed. According to one embodiment of the invention, a gain controller 114 is coupled to amplifiers 108 and 110. Gain controller 114 is operable to provide gain control from the input side of mixer unit 92.

In one embodiment, logic 46 of baseband processor 44 is operable to sample the quadrature components of the routed signal that is down converted by down conversion unit 30, to determine the level of carrier leakage using the result of the sampling, and to initiate an application of a DC offset signal to the respective inputs of amplifiers 108 and 110. Logic 46 is operable to adjust the DC offset until the result of sampling the quadrature component of the frequency-down-converted routed signal is approximately equal to a predetermined value. In one embodiment, the predetermined value is zero; however, any value that is acceptable for a particular communications device may be used as a predetermined value. In one embodiment, DC offset may be applied using digital-to-analog converter 40. As shown in FIG. 2, in one embodiment, converter 40 may be two separate converters 124 and 128. Converter 124 is coupled to amplifier 108 and converter 128 is coupled to amplifier 110. In one embodiment, converters 124 and 128 may be programmable. In one embodiment, logic 46 may be operable to initiate a carrier leakage reduction procedure periodically according to a predetermined schedule. For example, during the operation of phone 20, such as when a user is using phone 20 to communicate with another party, logic 46 may perform the carrier leakage reduction procedure once every second. Other time schedules or schedules based on events rather than time may also be used to periodically perform the carrier leakage reduction procedure.

In operation, a signal to be transmitted is up converted at mixer unit 92 and routed to inputs 67 and 71 of mixer unit 62 over path 32. In one embodiment, switch 61 closes path 32 to route the signal over path 32 and turns off amplifiers 64 and 120. Phase shifter 74 affects a 90-degree phase shift of the routed signal, and mixers 68 and 70 down convert the quadrature components of the received signal. The down converted quadrature components, referred to herein as "RXI" and "RXQ" as shown in FIG. 2, are sampled at baseband processor 44. In one embodiment, the sum of squares of RXI and RXQ yields a result that is proportional to the level of carrier leakage. After the sampling of RXI and RXQ, logic 46 applies a DC offset to the inputs of amplifiers 108 and 110 of up conversion unit 34 through converters 124 and 128, respectively. In one embodiment, logic 46 is operable to increase or decrease the voltage of the DC offset signal to determine which course of action results in a reduction of the carrier leakage. For example, if increasing the voltage decreases the carrier leakage, logic 46 continues to increase the voltage of the direct current offset signal until the sampling of RXI and RXQ approximately equals a predetermined value, such as zero. If the increase of the voltage of DC offset signal does not result in a reduction of carrier leakage, then logic 46 decreases the voltage of the DC offset signal to reduce the level of carrier leakage.

In one embodiment, transmission power level control may be applied using gain controller 114 that is coupled to amplifiers 108 and 110 without increasing the level of carrier leakage. This is advantageous in some embodiments because a more precise gain control is possible when gain control is applied from the input side of mixer unit 92 rather than from the output side of mixer unit 92. In one embodiment, logic 46 repeats the carrier reduction procedure described above according to a predetermined schedule that is suitable for a particular wireless device.

FIG. 3 is a block diagram illustrating one embodiment of a method 150 for reducing carrier leakage in a wireless device. For illustrative purposes, method 150 is described using the above-described features of phone 20; however, any suitable device or combination of devices may be used to implement method 150.

Method 150 starts at step 154. At step 158, a direct conversion unit, such as direct conversion unit 28 shown in FIG. 2, is provided to a wireless device, such as phone 20. At step 160, switch 61 deactivates amplifier 120 of up conversion unit 34 and amplifier 64 of down conversion unit 30. Up conversion unit 34 may be referred to as "transmit side," and down conversion unit 30 may be referred to as "receive side." Step 160 may be omitted in some embodiments. At step 164, an output signal of mixer unit 92 is routed to inputs 67 and 71 of mixer unit 62 by closing switch 61.

At step 168, baseband processor 44, which is on the output side of mixer unit 62, samples the quadrature components of the down-converted routed signal, which is shown as RXI and RXQ in FIG. 2. In one embodiment, sampling both quadrature components (e.g. RXI and RXQ) of the routed signal is advantageous because the result of the sampling is proportional to the level of carrier leakage, which may be used to monitor the change in the level of carrier leakage. Using the result of sampling, baseband processor 44 also determines whether the level of carrier is equal to a predetermined value. The predetermined value may be zero; however, any value that represents an acceptable level of carrier leakage may be used as a predetermined value. If no, then the "no" branch is followed to step 174 where logic 46 applies DC offset at an input side of mixer unit 92. In one embodiment, DC offset is applied using converters 40 at the respective inputs of amplifiers 108 and 110, which are located at the input side of mixer unit 92. If the result of the sampling is approximately equal to the predetermined value, then the "yes" branch is followed to decision step 180.

At decision step 180, logic 46 determines whether the carrier leakage reduction procedure, an embodiment of which is provided above, should be performed again. In one embodiment, the procedure is performed periodically according to a predetermined schedule. If yes, then "yes" branch is followed to step 160. If no, then "no" branch is followed to step 184, where method 150 stops.

Although some embodiments of the present invention have been described in detail, it should be understood that various changes, substitutions, and alterations can be made hereto without departing from the spirit and scope of the invention as defined by the appended claims.

What is claimed is:

1. A direct conversion unit for controlling carrier leakage in a wireless communications device, comprising:
a transmit circuitry including a first mixer unit having a transmit output, an in-phase input, a quadrature input, a first amplifier, and a second amplifier, the first amplifier and the second amplifier coupled to the in-phase input and the quadrature input, respectively, the first mixer unit operable to convert a signal into a transmission signal having a higher frequency than the signal, and to transmit the transmission signal through the transmit output;
a receive circuitry including a second mixer unit having a receive input, an in-phase output, and a quadrature output, the receive input coupled to the transmit output, the second mixer unit operable to receive the transmission signal through the receive input, to convert the transmission signal into an in-phase signal and a quadrature signal each having a lower frequency than the transmission signal, and to transmit the in-phase signal and the quadrature signal through the in-phase output and the quadrature output, respectively;
a digital to analog converter unit coupled to the first amplifier and the second amplifier, the converter unit operable to apply a direct current offset signal to the in-phase input and the quadrature input through the first and the second amplifiers, respectively;
a baseband processor coupled to the digital to analog converter unit, the in-phase output and the quadrature output, the baseband processor operable to receive the in-phase signal and the quadrature signal through the in-phase output and the quadrature output, respectively, to repeatedly sample the in-phase signal and the quadrature signal, to determine that a result from the sample is not equal to a predetermined value; and
a gain controller coupled to the first amplifier and the second amplifier, the gain controller operable to adjust a power level of the transmission signal by controlling the first amplifier and the second amplifier until a next result of the sample equals the predetermined value.

2. The direct conversion unit of claim 1, and further comprising:
a switch coupling the transmit output and the receive input;
a third amplifier having an output coupled to the receive input;
a fourth amplifier having an input coupled to the transmit output; and
wherein the switch is operable to deactivate the third amplifier and the fourth amplifier, and to electrically couple the transmit output and the receive input after deactivating the third and the fourth amplifiers.

3. The direct conversion unit of claim 1, wherein the predetermined value is zero.

4. The direct conversion unit of claim 2, wherein the predetermined value is zero.

5. The direct conversion unit of claim 1, wherein the baseband processor is operable to adjust the voltage of the direct current offset signal by changing the voltage in one direction, determining that a new result from the sampling is farther from zero than the result, and in response, changing the voltage in another direction until the next result is equal to zero.

6. A method for controlling carrier leakage in a communications device, comprising:
routing a first signal from an output of a first mixer unit to an input of a second mixer unit, the first mixer unit operable to receive a second signal and convert the second signal into the first signal having a higher frequency than the second signal, the second mixer operable to receive the second signal and convert the second signal into an in-phase signal and a quadrature signal each having a lower frequency than the second signal;
repeatedly sampling the in-phase signal and the quadrature signal;
determining that a result from the sampling is not equal to a predetermined value;
controlling gain of a first amplifier and a second amplifier which are coupled to the in-phase input and quadrature input, respectively, to adjust a power level of a transmission signal until a next result of the sampling equals the predetermined value.

7. The method of claim 6 wherein the predetermined value is zero.

8. The method of claim 6, wherein the higher frequency is within a range of frequency defined by a particular standard applicable to a wireless communications device within which the first and the second mixer units are used.

9. The method of claim 6, wherein the acts of routing, repeatedly sampling, determining, and adjusting are performed periodically according to a predetermined schedule during the operation of a wireless communications device, and further comprising deactivating a third amplifier coupled to the output and a fourth amplifier coupled to the input for each performance of the acts.

10. The method of claim 8, wherein the result is a first result, and adjusting the voltage comprises:
increasing the voltage;
determining that a difference between a second result of the sampling and zero is greater than a previous difference between the first result of the sampling and the predetermined value; and
decreasing the voltage.

11. The method of claim 8, wherein the result is a first result, and wherein adjusting the voltage comprises:
decreasing the voltage;
determining that a difference between a second result of the sampling and zero is greater than a previous difference between the first result of the sampling and the predetermined value; and increasing the voltage.

* * * * *